United States Patent [19]
Funatsu et al.

[11] 3,898,474
[45] Aug. 5, 1975

[54] POWER CIRCUIT

[75] Inventors: Michiro Funatsu, Yokohama; Akio Nakashima, Yokohama; Eiichi Matsumura, Tokyo, all of Japan

[73] Assignees: Nippon Electric Company, Limited; Hitachi, Ltd., both of Japan

[22] Filed: June 7, 1974

[21] Appl. No.: 477,460

[30] Foreign Application Priority Data
June 11, 1973 Japan............................ 48-64838

[52] U.S. Cl. ..................... 307/66; 307/75; 307/80; 323/22 T
[51] Int. Cl. .............................................. H02j 9/04
[58] Field of Search ............ 307/26, 64, 65, 66, 72, 307/73, 74, 75, 80; 323/15, 22 T

[56] References Cited
UNITED STATES PATENTS

| | | | |
|---|---|---|---|
| 3,573,483 | 4/1971 | White | 307/66 |
| 3,743,920 | 7/1973 | Ubillos | 307/74 X |
| 3,766,403 | 10/1973 | Tsutsumi | 307/66 |

*Primary Examiner*—A. D. Pellinen
*Attorney, Agent, or Firm*—Craig & Antonelli

[57] ABSTRACT

A power circuit in which a commercial AC power is supplied to an active filter through a rectifying circuit and a DC power is supplied directly to the active filter by the use of a switching mechanism for switching over between the commercial AC power and the DC power. The resistor for setting the voltage between the input and output terminals of the active filter is divided into two parts to one of which a transistor is connected in parallel. The transistor is turned on or off by the switchover of the switching mechanism so that the voltage between the input and output terminals of the active filter can be suitably switched over depending on whether the input power is an AC power or a DC power.

6 Claims, 3 Drawing Figures

POWER CIRCUIT

The present invention relates to a power circuit capable of being supplied by any of a commercial AC power supply and a DC power supply and supplying a load with a power through an active filter whichever power supply is utilized.

The present invention is suitably applicable to electronic equipments which can utilize both AC and DC power sources, in particular television receivers.

Figure 1:
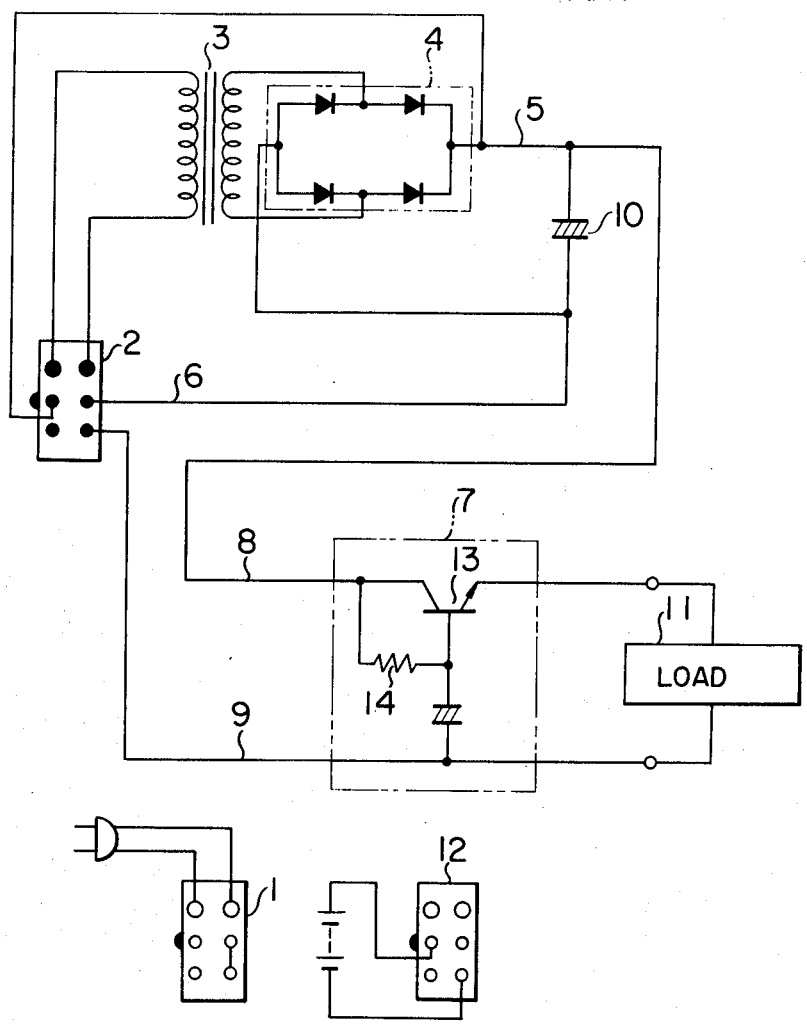
Figure 2:
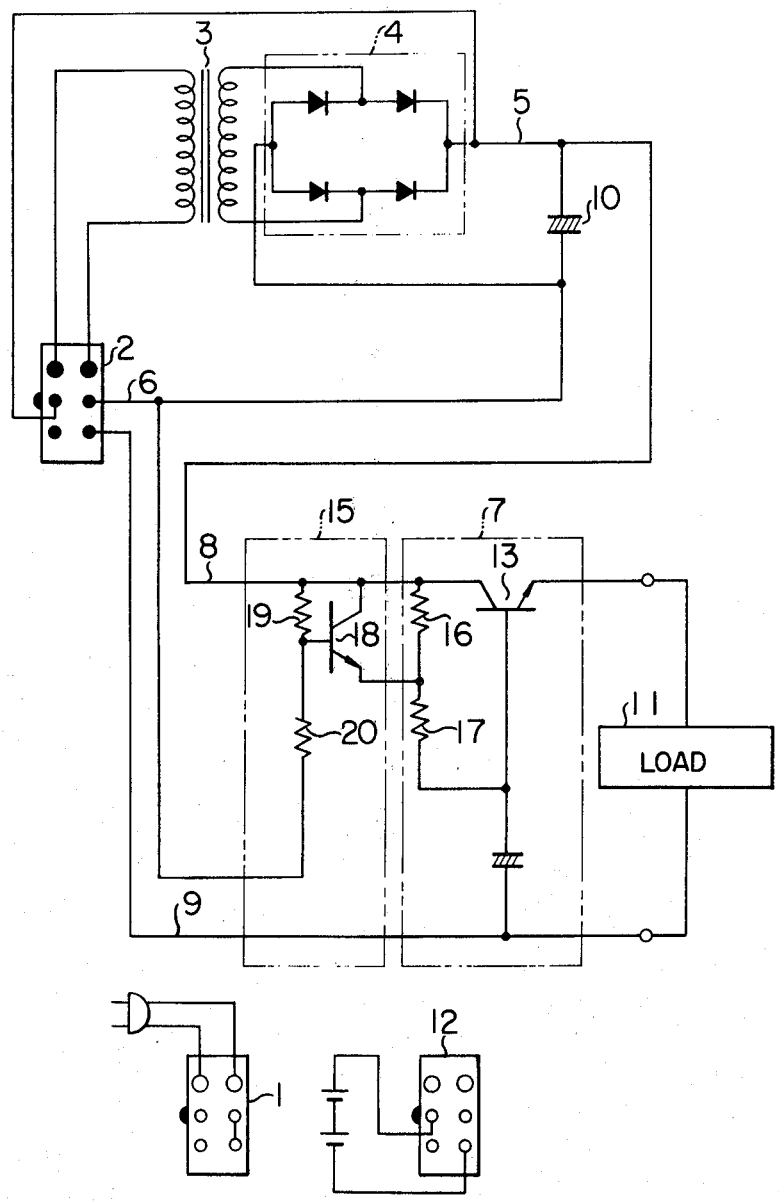
Figure 3:
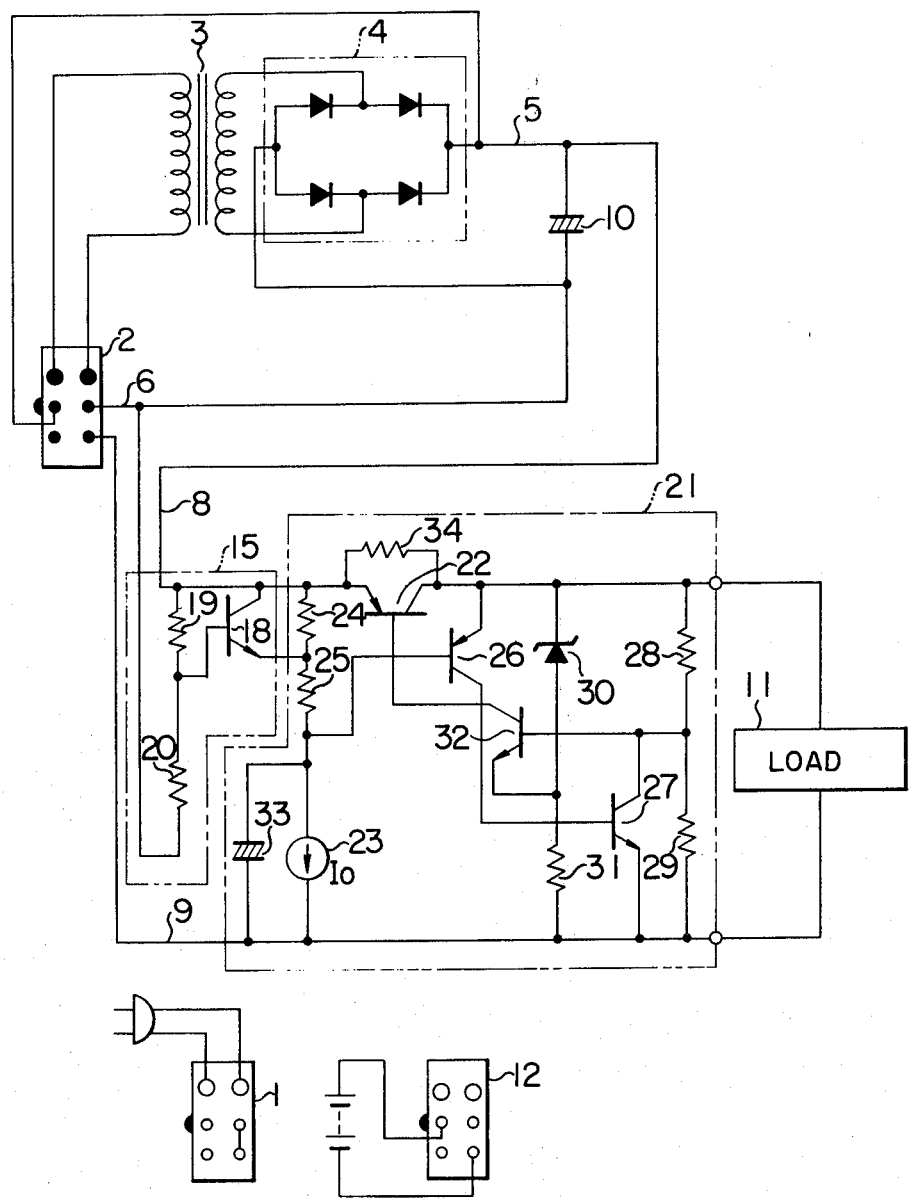

Prior art and the preferred embodiments and advantages of the present invention will be described in detail with reference to the accompanying drawings, in which:

FIG. 1 is a circuit diagram of a conventional power circuit for AC/DC equipments; and FIGS. 2 and 3 are circuit diagrams of power circuits for AC/DC equipments according to the present invention.

A conventional AC/DC power circuit is constructed as shown in FIG. 1.

When a commercial AC power supply is utilized, a plug 1 is connected to a power source socket 2 so that the AC power is supplied across the primary winding of a power transformer 3, when an output terminal 6 of a rectifying circuit 4 and an input terminal 9 of an active filter 7 are connected with each other. Consequently, the input AC power is stepped down by the power transformer 3, rectified and smoothed by the rectifying circuit 4 and a capacitor 10, and supplied to the active filter 7 through its input terminals 8 and 9 as a DC power containing a ripple component. The DC power with its ripple component being smoothed by the active filter 7 is supplied to a load 11.

When a DC power supply is utilized, its plug 12 is connected to the socket 2. In this case, the DC power is connected across the input terminals 8 and 9 of the active filter 7 and the output terminal 6 of the rectifying circuit 4 and the input terminal 9 of the active filter 7 are disconnected. Consequently, the DC power is smoothed by the active filter 7 and supplied to the load 11 as a DC power containing little ripple component.

The voltage produced between the input and output terminals of or across the active filter 7, which is hereinafter referred to as an inter-terminal voltage, is the sum of the voltage drop across a resistor 14 due to the base current of a transistor 13 and the base-emitter voltage $V_{BE}$ of the transistor 13.

It is customary that in the active filter utilized in this kind of AC/DC power circuit the resistance of the inter-terminal voltage setting resistor 14 is set at a value higher than that for the active filter for a DC power circuit so that the ripple component of an AC power containing a large ripple component can be smoothed. Consequently, if such a power circuit is used for a DC power, there arises the difficulty that the inter-terminal voltage of the filter 7 is too high to enable the filter to be used efficiently.

Therefore, an object of the present invention is to provide a novel and effective power circuit.

Another object of the present invention is to provide a novel and effective power circuit in which an AC power and a DC power are changed over by a switching mechanism so that the AC power is supplied to the active filter through a rectifying circuit while the DC power is supplied directly to the active filter circuit.

A further object of the present invention is to provide a power circuit capable of efficiently operating the active filter for both AC and DC powers by varying the inter-terminal voltage of the active filter depending on whether the input power is an AC power or a DC power.

FIG. 2 is an embodiment of the power circuit according to the present invention. A block 15 is the circuit added to the conventional power circuit shown in FIG. 1 by the teaching of the present invention. Resistors 16 and 17 are ones for setting the inter-terminal voltage of the active filter 7 similarly to the resistor 14 in FIG. 1 and connected between the collector and the base of the transistor 13. To one terminal of the resistor 16 is connected the collector of a switching transistor 18 and to the other terminal of the resistor 16 is connected the emitter of the transistor 18, the base of which is connected to the junction point of resistors 19 and 20 connected in series between the terminals 6 and 8.

The ratio between the resistances of the resistors 19 and 20 are selected such that the voltage resulting from dividing the voltage applied between the input terminals 6 and 8 of the active filter 7 becomes lower than the emitter voltage of the transistor 18.

When the input power is an AC power, the terminals 6 and 9 are connected, so that the base voltage of the transistor 18 is lower than the emitter voltage due to the series connection of the resistors 19 and 20. Thus, the transistor 18 is in the non-conductive state. However, when the input power is a DC power, the terminals 6 and 9 are disconnected to open one end of the resistor 20, so that the base voltage of the transistor 18 rises up to the voltage on the terminal 8 to make the transistor 18 conductive. Consequently, the inter-terminal voltage of the filter 7 for an input AC power is the sum of the voltage drop across the series connected resistors 16 and 17 due to the base current of the transistor 13 and the base-emitter voltage of the transistor 13. In contrast, the inter-terminal voltage of the filter 7 for an input DC power is the sum of the voltage drop across the resistor 17 due to the base current of the transistor 13, the voltage drop across the resistor 19 due to the base current of the transistor 18, the base-emitter voltage of the transistor 18, and the base-emitter voltage of the transistor 13.

Consequently, if the resistance of the resistor 17 is selected to be such a value as suitable for smoothing a DC power containing a small ripple component, and if the sum of the resistances of the resistors 16 and 17 is selected to be such a value as suitable for smoothing an AC power containing a large ripple component, the active filter 7 can be effectively operated for both AC and DC powers.

If the ratio between the resistances of the resistors 19 and 20 is determined such that the voltage divided by the resistors 19 and 20 is lower than the emitter voltage of the transistor 18 and at the same time if the resistance of the resistor 19 is set at a low value, the active filter 7 can be more efficiently utilized because the voltage drop due to the resistor 19 is reduced.

FIG. 3 is another embodiment of the power circuit according to the present invention. This is an application of the present invention to a circuit 21 which functions as a constant voltage circuit when the input voltage supplied across the terminals 8 and 9 is higher than a predetermined value and which functions as an active filter when the input voltage is lower than a predetermined value.

Since the operation of the circuit 21 is known, a description thereof will be given only briefly. Reference numeral 22 designates a control transistor and reference numeral 23 designates a constant current circuit. Consequently, when the transistor 18 is not connected, a constant current is always flowing through resistors 24 and 25 so that the inter-terminal voltage of the series connected resistors 24 and 25 is maintained constant. Since the inter-terminal voltage of the series connected resistors 24 and 25 is lower than the collector-emitter voltage of the transistor 22 when the voltage across the terminals 8 and 9 is higher than a predetermined value, that is, since the voltage at the junction point between the resistor 25 and the constant current circuit 23 is higher than the collector voltage of the transistor 22, transistors 26 and 27 are in the cut-off or non-conductive state. Consequently, since the fluctuation of the load voltage is detected and amplified by an error amplifier circuit composed of resistors 28 and 29, a Zener diode 30, a resistor 31, and an error amplifying transistor 32 and since the control transistor 22 is controlled by the output of the error amplifier circuit, a constant voltage is supplied to the load 11.

When the voltage between the terminals 8 and 9 is lower than a predetermined value, if the transistors 26 and 27 are absent, the transistor 22 loses the amplifying function so that a voltage containing a ripple component is supplied to the load 11. However, in the present circuit, since the collector potential of the transistor 22 becomes higher than the potential at the junction point between the resistor 25 and the constant current circuit 23 to allow the transistors 26 and 27 to become conductive and to reduce the base currents of the transistors 32 and 22, the transistor 22 maintains the amplifying function so that the ripple component is reduced though the load voltage is reduced depending on the voltage between the terminals 8 and 9. That is, the circuit 21 acts as an active filter. In the circuit 21 reference numeral 33 designates a smoothing capacitor and reference numeral 34 designates a resistor for starting the circuit 21 when an input voltage is applied.

Also for the circuit 21, when utilized as an active filter, it is desirable to set the inter-terminal voltage thereof suitably for each of input AC and DC powers depending on the magnitude of the ripple component at the time of application of the input powers.

The transistor 18 is non-conducted for an AC power, while it is conducted for a DC power as described in the embodiment of FIG. 2. Consequently, if the base-emitter voltage of the transistor 26 is denoted by $V_{BE}$, if the resistances of the resistors 24 and 25 are denoted by $R_a$ and $R_b$, respectively, and if the current of the constant current circuit 23 is denoted by $I_o$, the inter-terminal voltage $V_1$ of the circuit 21 for the AC power is expressed as $$V_1 = I_o (R_a + R_b) - V_{BE} \qquad (1)$$

The inter-terminal voltage $V_2$ of the circuit 21 for a DC power is expressed as $$V_2 = I_o \cdot R_b + V_{BE} - V_{BE'} \qquad (2)$$

where $V_{BE'}$ is the base-emitter voltage of the transistor 18, and where the voltage drop due to the resistor 19 is neglected because it is low compared with the voltages $V_{BE'}$ and $V_{BE}$.

Since the voltages $V_{BE'}$ and $V_{BE}$ are determined for the transistors and do not vary noticeably, the inter-voltages $V_1$ and $V_2$ are determined by the resistances of the resistors 24 and 25 and the current $I_o$ as is evident from Formulas (1) and (2). Thus, the resistors 24 and 25 are resistors for setting the inter-terminal voltage of the circuit 21 when it is operated as an active filter. Since the inter-terminal voltage $V_1$ of the circuit 21 for the AC power is determined by the resistances of the resistors 24 and 25 and since the inter-terminal voltage $V_2$ for the DC power is determined by the resistance of the resistor 25, the inter-terminal voltage of the circuit 21 can be suitably selected depending on the magnitude of the ripple component of the input power used.

As described above, according to the present invention, since the active filter can be efficiently operated for both AC and DC powers by varying the inter-terminal voltage of the filter depending on the kind of the input power, useless power consumption can be avoided.

For AC/DC equipments, for example for AC/DC television receivers it is one of important problems how to reduce the consumption of batteries. According to the present invention useless power consumption can be avoided. Consequently, the present invention can be preferably applied to television receivers.

What we claim is:

1. A power circuit comprising an AC power supply, a DC power supply, a rectifying circuit, and active filter circuit connected to an output terminal of the rectifying circuit, switching means for connecting, when the input power is an AC power, the AC power to the input terminals of the rectifying circuit and for connecting, when the input power is a DC power, the DC power to the input terminals of the active filter, first and second resistors connected in series for setting the inter-terminal voltage of the active filter, and a transistor connected in parallel to the first resistor, the switching means turning the transistor off when the input power is the AC power and turning the transistor on when the input power is the DC power to vary the inter-terminal voltage of the active filter depending on whether the input power is the AC power or the DC power.

2. A power circuit comprising an AC power supply, a DC power supply, a rectifying circuit having first and second input terminals and first and second output terminals, an active filter having first and second input terminals and first and second output terminals, the first input terminal of the active filter being connected to the first input terminal of the rectifying circuit, a load connected between the first and second output terminals of the active filter, switching means for connecting, when the input power is an AC power, the AC power between the first and second input terminals of the rectifying circuit and connecting the second output terminal of the rectifying circuit to the second input terminal of the active filter and for connecting, when the input power is a DC power, the DC power between the first and second input terminals of the active filter, series connected first and second resistors provided to the active filter for setting the inter-terminal voltage of the active filter, a transistor having an input terminal, an output terminal, and a control terminal, the input terminal of the transistor being connected to one end of the first resistor, the output terminal of the transistor being connected to the other end of the first resistor, and fourth and fifth resistors connected in series between the first input terminal of the active filter and the second output terminal of the rectifying circuit, the control terminal of the transistor being connected to the junction point between the fourth and fifth resistors, whereby the transistor is turned off when the input power is the AC power and turned on when the input power is the DC power to vary the inter-terminal voltage of the active filter depending on whether the input power is the AC power or the DC power.

3. A power circuit according to claim 2, in which the active filter comprises a transistor having an input terminal, an output terminal, and a control terminal, the input terminal of the transistor being connected to the first input terminal of the active filter, the output terminal of the transistor being connected to the first output terminal of the active filter, a capacitor one terminal of which is connected to the control terminal of the transistor and the other terminal of which is connected to the second input terminal and the second output terminal of the active filter, and first and second resistors connected between the input terminal and the control terminal of the transistor.

4. A power circuit according to claim 2, in which the active filter comprises a power processing circuit which operates as a constant voltage circuit when the input power is higher than a predetermined value and operates as a filter when the input power is lower than a predetermined value.

5. A power circuit according to claim 4, in which the active filter compreses a control transistor connected in series between the first input terminal and the first output terminal of the active filter, an error detector and amplifier circuit including detecting means for detecting the variation in the output voltage and connected between the first and second output terminals of the active filter for detecting and amplifying the variation in the output voltage to supply it to the control transistor, an input/output voltage difference detecting transistor which becomes conductive, when the voltage between the input and the output of the control transistor becomes lower than a predetermined value, to produce an output current corresponding to the voltage between the input and output of the control transistor, and a transistor driven in response to the output of the input/output voltage difference detecting transistor to vary the impedance of the output voltage detecting means of the error detector and amplifier circuit, and operates as a ripple filter when the input voltage becomes lower than a predetermined value.

6. A power circuit according to claim 2, in which the active filter comprises a control transistor whose emitter is connected to the first input terminal of the active filter and whose collector is connected to the first output terminal of the active filter, an error detector and amplifier circuit including fifth and sixth resistors for output voltage detection and connected between the first and second output terminals of the active filter for detecting and amplifying the variation in the voltage between the first and second output terminals of the active filter, a series circuit of the first and second resistors and a constant current source connected between both ends of the power supply, an input/output voltage difference detecting transistor whose base is connected to the junction point of the second resistor and the constant current source, whose emitter is connected to the collector of the control transistor, and which becomes conductive, when the emitter-collector voltage of the control transistor becomes lower than a predetermined value, to produce an output current corresponding to the emitter-collector voltage of the control transistor, and a transistor whose collector is connected to one end of the fifth resistor, whose emitter is connected to the other end of the fifth resistor, and whose base is connected to the collector of the input/output voltage difference detecting transistor.

* * * * *